(12) United States Patent
Wieder

(10) Patent No.: US 7,168,942 B1
(45) Date of Patent: Jan. 30, 2007

(54) METHOD AND APPARATUS FOR MOLD TEMPERATURE CONTROL USING AIR

(75) Inventor: Horst K. Wieder, Watertown, WI (US)

(73) Assignee: CITO Products, Inc., Watertown, WI (US)

( * ) Notice: Subject to any disclaimer, the term of this patent is extended or adjusted under 35 U.S.C. 154(b) by 208 days.

(21) Appl. No.: 10/632,066

(22) Filed: Jul. 31, 2003

(51) Int. Cl.
*B29C 33/02* (2006.01)

(52) U.S. Cl. .................. 425/552; 425/547; 425/143; 425/144; 425/170; 264/40.6; 264/328.16; 249/79

(58) Field of Classification Search .............. 425/547, 425/552, 143, 144, 170; 264/40.6, 328.16; 249/79
See application file for complete search history.

(56) References Cited

U.S. PATENT DOCUMENTS

| | | | |
|---|---|---|---|
| 2,535,436 A | 12/1950 | Maynard | |
| 3,259,175 A | 7/1966 | Kraus et al. | |
| 3,583,467 A | 6/1971 | Bennett et al. | |
| 3,763,293 A | 10/1973 | Nussbaum | |
| 4,246,214 A | 1/1981 | Osswald et al. | |
| 4,354,812 A | 10/1982 | Wieder et al. | |
| 4,420,446 A | 12/1983 | Wieder et al. | |
| 4,548,773 A | 10/1985 | Suh et al. | |
| 4,553,583 A | 11/1985 | Perrella et al. | |
| 4,586,690 A | 5/1986 | Härtel et al. | |
| 4,623,497 A | 11/1986 | Waters | |
| 4,690,789 A | 9/1987 | Ritchie et al. | |
| 4,902,454 A | 2/1990 | Steinbichler et al. | |
| 4,976,900 A * | 12/1990 | Tsutsumi | 264/39 |
| 5,026,512 A | 6/1991 | Chang | |
| 5,376,317 A | 12/1994 | Maus et al. | |
| 5,427,720 A | 6/1995 | Kotzab | |
| 5,460,761 A * | 10/1995 | Larsson | 264/39 |
| 5,589,114 A | 12/1996 | Evans | |
| 5,591,385 A | 1/1997 | Arai et al. | |
| 5,772,933 A | 6/1998 | Kotzab | |
| 5,792,392 A | 8/1998 | Maus et al. | |
| 6,312,628 B1 | 11/2001 | Wieder et al. | |
| 2002/0162940 A1 * | 11/2002 | Frul et al. | 249/79 |

* cited by examiner

*Primary Examiner*—Joseph S. Del Sole
*Assistant Examiner*—Maria Veronica Ewald
(74) *Attorney, Agent, or Firm*—Foley & Lardner LLP

(57) ABSTRACT

A method and apparatus for controlling the temperature of an injection mold passes pressurized air contained in an air supply tube through an orifice into an exhaust channel, wherein the pressure of the air in the exhaust channel is lower than the pressure of the air in the air supply tube. As the pressurized air is released through the orifice, cooling is produced that can be applied to a portion of an injection mold where cooling is desired, in order to control the temperature of that portion of the injection mold.

31 Claims, 10 Drawing Sheets

METHOD AND APPARATUS FOR MOLD TEMPERATURE CONTROL USING AIR

FIELD OF THE INVENTION

This invention relates generally to injection molds for molding objects out of thermoplastics, aluminum, and the like, and more particularly to a method and device for controlling the temperature of such a mold during molding processes.

BACKGROUND OF THE INVENTION

Injection molding is a well-known process used for the fabrication of plastic or metal objects or parts having complex shapes. In the injection molding process, a molten material, such as a plastic or a metal, is introduced into a mold and allowed to set or cure by cooling. Once the molten material is set or cured, the mold is opened, and the molded object is released. The temperature of the mold is preferably controlled throughout the molding process, for example to ensure the quality of the molded object, and to maximize production throughput.

Proper temperature control is important when the molten material is injected into the mold, for example to avoid problems such as incomplete fill, poor part weld, and excessive stress in the part. The optimal mold temperature specified by the material manufacturer is typically well above room temperature, so proper temperature control usually requires heating the mold before introducing molten material into the mold.

Various methods can be used to heat injection molds to an optimal temperature before introducing molten material. For example, the mold can be heated simply by introducing molten material. This approach may necessitate a startup cycle wherein the first few molded parts contain defects, for example because of incomplete fill, and these defective parts must be discarded or recycled until the mold reaches an adequate temperature to produce parts that are free of defects. Another disadvantage of using molten material to heat the mold is that the mold must keep molding parts without interruption, or the mold will cool and the startup cycle and its associated waste must be repeated. Depending on the work environment, this startup cycle could be needed every morning, lunchtime, or coffee break. Similarly, variations in the delay between molding of successive objects can result in variations in the temperature of the mold when the successive objects are molded, which may reduce the uniformity of the successive objects.

External heat sources can also be used to heat the mold to an optimal temperature, for example electric heating elements or heated fluid can be used. These external heat sources can be applied to the mold in a variety of ways known in the art. External heat sources can avoid the required startup cycle and waste associated with using molten material to heat the mold. This approach can also ensure that the mold temperature remains consistent across the molding of successive objects, thereby improving the uniformity of the successive objects.

To produce high quality molded parts, optimum temperature control may require the application of heat in a non-uniform fashion, both across the area of the mold and over time. Heat can be applied at the periphery of the mold to heat the entire mold to a temperature which is essentially uniform across the molding surface, or applied in a non-uniform fashion to specific portions of the molding surface, for example the extremities of the mold cavity that may be the areas most likely to experience problems such as incomplete fill. Heat can be applied continuously over time, as a pulse of heat at a certain point in the mold cycle, or in a time-varying fashion.

Proper temperature control is also important after the molten material has been injected into the mold, during the period of time when the molded object sets or cures. When hot molten material is injected into a mold, the mold absorbs heat from the molten material and the temperature of the mold will increase toward the temperature of the molten material being injected into the mold. Thus, after molten material has been injected into the mold, it is desirable to provide cooling to remove heat from the mold and the molten material contained in the mold so that the molded object will set or cure, for example, to improve the quality of the objects being molded or to increase the productivity of the mold.

As with heating, optimum temperature control may require the application of cooling in a non-uniform fashion, both across the area of the mold and over time. Cooling can be applied at the periphery of the mold to cool the entire mold uniformly, or applied in a non-uniform fashion to specific portions of the mold, for example, the hottest areas of the mold such as thick portions of the mold cavity that receive a relatively large volume of molten material, portions near the injection channel for molten material that receive molten material that is relatively hot, or portions adjacent to heating elements. Cooling can be applied continuously over time, as a pulse at a certain point in the mold cycle, or in a time-varying fashion.

Proper temperature control after the molten material has been injected into the mold can affect the quality of the molded parts in a number of ways. For example, it is generally desirable to control the eventual temperature and cooling rate so that the plastic or metal object being molded exhibits the least possible amount of shrinkage and distortion during the setting or curing process. It is also important to control the application of cooling so as to ensure uniformity among replications of the object being molded.

In addition to improving the quality of the molded objects, proper temperature control can maximize productivity of the mold. For example, to minimize the setting or curing time after molten material has been injected the mold should be quickly cooled to an optimal temperature for setting or curing the object being molded, at the maximum rate possible which will nonetheless result in a molded object of acceptable quality. Similarly, after a first object is molded and removed from the mold, the mold should be heated quickly to an optimal temperature for receiving a new injection of molten material to form a second object, at the maximum rate possible which will not damage the mold or otherwise adversely affect the molding process.

Temperature control of an injection mold has been accomplished by circulating fluid through channels fashioned in the walls of the mold. In such a system, fluid is heated and then circulated through the mold to heat the mold to an optimum temperature before the first injection or "shot" of hot plastic or metal material is introduced into the mold. Because there is good thermal conductivity between the mold and the fluid, the temperature of the mold will be close to the temperature of the fluid until molten material is injected into the mold. The optimum temperature of the fluid and the mold is usually well above room temperature but below the temperature of the hot molten material.

Upon the introduction of the hot molten material, the temperature of the mold increases above the temperature of the fluid. The temperature of the fluid, however, is maintained at the optimum temperature, for example using an external heat exchanger or chiller. The continuous circulation of the fluid removes heat from the mold, thereby returning the temperature of the mold (and the molten material forming the object being molded) to a temperature at or near the temperature of the fluid so that the object being molded sets or cures. With this approach, the fluid can be circulated through the mold substantially all the time that the mold is being used to make successive replications of the object being molded.

Methods and devices for controlling the temperature of a fluid-cooled injection mold without the need for a continuous flow of cooling fluid are described in U.S. Pat. Nos. 4,354,812 and 4,420,446 to Horst K. Wieder, et al. These patents describe methods by which an injection mold can be maintained at a desired operating temperature using a cooling fluid which need not be elevated to or maintained at an ideal operating temperature. Accurate control of the temperature of an injection mold can be achieved by mounting a temperature sensor onto or within the mold. The temperature sensor provides an output signal indicative of the mold temperature. If the sensed mold temperature exceeds a selected control temperature level, a valve is opened to allow cooling fluid to enter the cooling channels in the mold, to thereby cool the mold. When the temperature sensor indicates that the mold is cooled below the control temperature, the valve is closed. Since cooling fluid is not continuously pumped through the mold cooling channels, the cooling fluid need not be heated to a particular operating temperature and the consumption of cooling fluid is reduced.

Another method of injection mold temperature control is described in U.S. Pat. No. 5,427,720 to Kotzab. Typically, a plurality of cooling channels are formed in an injection mold to provide cooling fluid to the mold. This patent describes determining, empirically or by calculation, a selected distribution profile for distributing cooling fluid among the cooling channels to achieve the desired amount of cooling of the injection mold. Depending upon the shape of the object being molded, certain portions of the injection mold may require more cooling than others. At the same time during each molding cycle, a temperature sensor signal is used to determine the temperature deviation of the mold from a desired temperature. Simultaneously, valves are opened to provide pulses of cooling fluid through the cooling channels in the pre-determined distribution profile. The duration of the cooling pulses is determined by the measured temperature deviation.

For some applications, the "pulse" cooling injection mold temperature control schemes just described may employ ordinary tap water as the cooling fluid. However, for many molding operations, the operating temperature of an injection mold can be very high. For example, the operating temperature of an injection mold for a high temperature molding process may be 300 F or higher, and the molten material injected into the mold may typically be at 700 F or higher. Water may be unsuitable as a cooling fluid for such high temperature molding operations without additional measures, such as pressurization, since water at normal atmospheric pressure will instantly turn to steam upon entering the cooling fluid channels of such a high temperature injection mold.

Petroleum-based oils or synthetic heat transfer fluids have been employed as cooling fluids for controlling the mold temperature of high temperature injection molding operations. The use of such materials for high temperature injection mold cooling has several important limitations, however. Such fluids have an inherently poor heat transfer rate. Thus, the time needed during a production cycle to bring the injection mold to the desired operating temperature using such fluids is relatively long, thereby increasing the cycle duration, and decreasing the production rate.

Furthermore, petroleum based oils are difficult to work with and potentially dangerous. The combination of petroleum-based oil and high temperatures presents a fire hazard. The use of oil-based cooling fluids can also adversely affect the quality of a molded object. Hydrocarbon molecules from the cooling oil can get into the mold itself. These molecules will leave flow marks on the molded plastic or metal object. These flow marks can adversely affect the quality and appearance of the molded object. In particular, flow marks on an aluminum die cast object, caused by oil based cooling fluid contamination, will prevent finishing of the aluminum object in the affected area. If the die cast aluminum object cannot be finished properly, it must typically be scrapped or recycled.

SUMMARY OF THE INVENTION

The present invention passes pressurized air contained in an air supply tube through an orifice member into an exhaust channel, wherein the pressure of the air in the exhaust channel is lower than the pressure of the air in the air supply tube, thereby producing cooling at the orifice member. The orifice member is mounted in thermal communication with a portion of an injection mold where cooling is desired, whereby the cooling at the orifice member can be used to control the temperature of the portion of the injection mold where cooling is desired.

A variety of structures can be used in a method and apparatus according to the invention. The air supply tube and exhaust channel can be, for example, aluminum tubes or holes bored in an injection mold. The air supply tube and exhaust channel may have any shape, for example they are not necessarily cylindrical or elongated. The air supply tube and exhaust channel are not necessarily concentric, although they can be. The orifice member can be formed in a variety of ways, for example, as a tube having a small hole in its side or end, a disc or plug having a small hole, a partially opened valve, a porous or fibrous plug, a tortuous tube, or a capillary tube.

Thermal communication between the orifice member and a portion of an injection mold where cooling is desired can also be accomplished in a variety of ways. For example, the orifice member can be mounted in direct contact with the portion of the injection mold where cooling is desired. Alternatively, the orifice member can be mounted in thermal contact, using a heat sink, thermal grease, or other structure or material providing thermal conductivity, with the portion of the injection mold where cooling is desired. The orifice member can be mounted so that at least a portion of the pressurized air released through the orifice member strikes the portion of the injection mold where cooling is desired. The orifice member can also be mounted so that at least a portion of the pressurized air released through the orifice member strikes a heat sink or other structure having a high level of thermal conductivity, where that heat sink or other structure is in thermal contact with the portion of the injection mold where cooling is desired. Of course, a combination of these approaches can be used to provide thermal communication between the orifice member and the portion of the injection mold where cooling is desired.

In a preferred embodiment according to the invention, an air compressor produces pressurized air that is cooled using one or more after coolers. The cooled pressurized air is supplied to one end of an insulated air jet tube that is centrally mounted in an exhaust channel bored into an injection mold. The other end of the insulated air jet tube is sealed except for a small hole, and that end of the insulated air jet tube is positioned adjacent to an area of the mold in which cooling is desired. A portion of the cooled pressurized air in the insulated air jet tube passes out of the small hole into the exhaust channel, whereby cooling occurs in the vicinity of the small hole including the area of the mold in which cooling is desired.

According to another aspect of the invention, an air supply valve is mounted to regulate the flow of pressurized air to an air supply tube supplying pressurized air to an orifice member mounted in thermal communication with a portion of a mold to be cooled, in order to adjust the magnitude and timing of cooling of that portion of the mold (for example to assure that a molded object is properly set to achieve a high quality part, while minimizing the cooling time in order to maximize the production rate). The air supply valve is opened or closed to regulate the flow of pressurized air to the orifice member at one or more selected times and selected durations to adjust the magnitude and timing of cooling.

According to another aspect of the invention, an air exhaust valve is mounted to regulate the back pressure in an exhaust channel which receives air from an orifice member mounted in thermal communication with a portion of a mold to be cooled, in order to adjust the magnitude and timing of cooling. The exhaust valve is opened to vent the exhaust channel and reduce the back pressure in the exhaust channel, thereby increasing the amount of cooling provided at the orifice member. The exhaust valve is closed to block the exhaust channel and increase the back pressure in the exhaust channel, thereby decreasing the amount of cooling provided at the orifice member.

According to another aspect of the invention, a source of pressurized air, wherein the pressure of the supplied air is adjustable, supplies pressurized air to an air supply tube that supplies air to an orifice member, wherein the orifice member is mounted in thermal communication with a portion of a mold to be cooled and wherein the orifice member exhausts the air to an exhaust channel, in order to adjust the magnitude and timing of cooling. The pressure of the supplied air is increased or decreased to vary the difference in the air pressure between the air supply tube and the exhaust channel, thereby increasing or decreasing the amount of cooling provided at the orifice member.

According to another aspect of the invention, an orifice member having an adjustable size aperture is mounted in thermal communication with a portion of a mold to be cooled, and the size of the aperture of the orifice member is used to adjust the magnitude and timing of cooling. For example, the adjustable size aperture orifice member can be comprised of a partially opened valve whose degree of opening can be adjusted or controlled. Similarly, a porous plug can be selected from a plurality of porous plugs having pores of various sizes, or a fibrous plug can be selected from a plurality of fibrous plugs having fibers of various densities, or a capillary tube can be selected from a plurality of capillary tubes of various sizes, to form an orifice member whose aperture size can be adjusted or controlled.

According to another aspect of the invention, an orifice member having a plurality of orifices mounted in close proximity to one another is mounted in thermal communication with a portion of a mold to be cooled, wherein at least one orifice in the plurality of orifices can be opened and closed independently of at least one other orifice in the plurality of orifices, and the number of orifices open in the plurality of orifices is used to adjust the magnitude and timing of cooling.

According to another aspect of the invention, a variety of techniques can be used to control the timing or magnitude of cooling of a portion of a mold to be cooled by controlling any of the above control variables (opening or closing an air supply valve, opening or closing an air exhaust valve, adjusting the pressure of supplied air, adjusting the effective size of an aperture of an orifice member, or adjusting the number of open orifices in an orifice member having a plurality of orifices.

For example, one or more temperature values can be monitored using one or more temperature sensors which can be, for example, mounted to monitor the temperature of a portion of the mold to be cooled, a portion of the object being molded, a portion of the pressurized air or air supply tube, or a portion of the exhaust air or exhaust channel. A process controller can receive one or more of the monitored temperature values and adjust one or more of the aforementioned control variables, individually or in combination, to control the magnitude and timing of cooling provided by one or more orifice members.

One or more air flow values can be monitored using one or more flow sensors which can be, for example, mounted to monitor the flow of air in one or more air supply tubes, orifice members, or exhaust channels. A process controller can receive one or more of the monitored air flow values and adjust one or more of the aforementioned control variables, individually or in combination, to control the magnitude and timing of cooling provided by one or more orifice members.

One or more of the aforementioned control variables, individually or in combination, may also be adjusted at one or more selected times and selected durations during each molding cycle to provide pre-set amounts of cooling at specific points in the molding cycle.

More than one air supply valve, air exhaust valve, pressurized air supply, or orifice member can be employed to provide cooling through one or more orifice members or pluralities of orifice members placed in thermal communication with different portions of the mold. The openings and closings of such air supply valves or air exhaust valves, the pressures of the supplied air from such pressurized air supplies, the effective aperture sizes of such orifice members, the number of orifice members which are open in a plurality of orifice members, or the number of orifices which are open in an orifice member having a plurality of orifices can be controlled independently to provide optimized cooling in different parts of the mold to assure product quality and maximize production rates.

Injection mold cooling employing air in accordance with the present invention can be implemented in either a closed loop system, in which the air is recycled, or an open loop cooling system, in which the air is exhausted to the atmosphere.

In either a closed loop or an open loop system, the pressurized air can be cooled, filtered, dehumidified, humidified, or otherwise processed, or surfactants, cleaners, water, water vapor, or other substances can be added, for example to help keep impurities from building up in the cooling system or to improve the cooling efficiency of the cooling system. In either type of system, the pressurized air supply can be connected directly to an air supply channel leading to a cooling orifice member, or the pressurized air supply can be connected to an air supply valve that controls the flow of pressurized air to an air supply channel leading to a cooling orifice member. In either type of system, air passing out of the cooling orifice member travels through an exhaust channel, which may include an air exhaust valve.

In an open loop cooling system in accordance with the present invention, pressurized air for cooling an injection mold is obtained directly from the atmosphere, compressed using an air compressor to provide a pressurized air supply, and, after passing through the orifice member for cooling, exhausted to the atmosphere via a muffler.

In a closed loop cooling system in accordance with the present invention, the pressurized air used in the cooling process is retained in a closed system. A closed loop cooling system can be preferred when the pressurized air is filtered, dehumidified, or otherwise processed to make the pressurized air more suitable for pressurization or more suitable for use with an orifice member to provide cooling.

A closed loop cooling system may also be preferred when a gas or a mixture of gases other than pressurized air, for example carbon dioxide or nitrogen, is employed for injection mold cooling in accordance with the present invention. The use of processed air or a purified gas may prevent impurities from clogging the orifice members, air supply tubes, exhaust channels, or other air flow components over time. This can be especially important in regard to the orifice members, since the relatively small size of the apertures in the orifice members means that even minimal deposits of impurities in the aperture of an orifice member can change the effective size of that aperture and thereby change the magnitude of cooling provided by that orifice member.

Pressurized air or other gas from a single compressor or pressurized storage tank can be used to supply pressurized air or other gas simultaneously to multiple air supply valves associated with multiple cooling orifice members. These multiple cooling orifice members can be located at multiple locations in a single injection mold or at multiple locations in multiple injection molds in accordance with the present invention. Each such cooling orifice member can have an independent air supply valve associated therewith such that the air flow to that cooling orifice member can be controlled independently by a process controller, or a single air supply valve can be used to control air to multiple cooling orifice members through an air supply manifold. Similarly, each such cooling orifice member can have an independent exhaust air valve associated therewith such that the back pressure to that cooling orifice member can be controlled independently by a process controller, or a single exhaust air valve can be used to control back pressure to multiple cooling orifice members through an exhaust air manifold.

Injection mold cooling in accordance with the present invention provides many advantages over previous methods of controlling the temperature of injection molds, and can be employed in any type of injection molding application, e.g., for forming plastic or metal objects and for high or low temperature applications. Since pressurized air is used for mold temperature control, the potential fire hazard associated with using petroleum based oils for high temperature mold cooling is eliminated. Pressurized air will not contaminate or damage a molded object, as can oil-based cooling fluids. The location of an orifice member (and therefore the position of the cooling effect provided by that orifice member) and the size and number of orifice members (and therefore the magnitude of the cooling effect at multiple positions) can be changed more readily than the location and magnitude of cooling produced by cooling channels carrying oil or other cooling fluids. Thus, the present invention provides improved cooling of injection molds for the production of high quality molded objects at a high production rate.

Further objects, features, and advantages of the invention will be apparent from the following detailed description when taken in conjunction with the accompanying drawings.

DETAILED DESCRIPTION OF THE INVENTION

Figure 1:
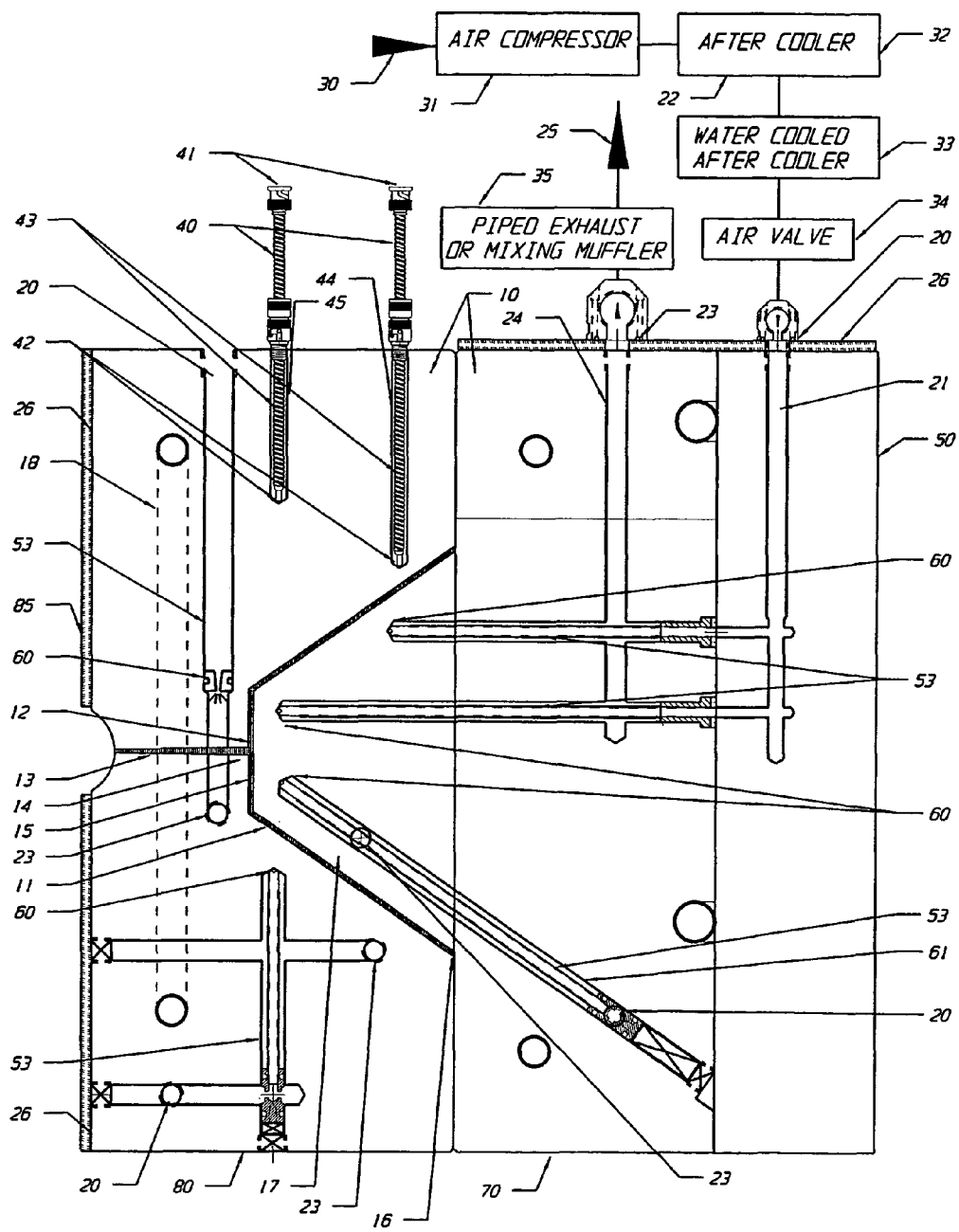
FIG. 1 is a cross-sectional view of an injection mold and exemplary mold cooling apparatuses in accordance with the invention, with the injection mold shown in the closed position.

Referring to the drawings, FIG. 1 is a cross-sectional view of an exemplary injection mold which includes various aspects and embodiments of an apparatus for mold temperature control using air in accordance with the invention. The exemplary injection mold, shown generally at 10, is in the closed position in FIG. 1. The injection mold 10 includes a mold cavity 11 having one or more molding surfaces 12. The mold cavity 11 receives molten material 13 for forming a molded object, for example using one or more injection channels 14 to inject the molten material 13 into the mold cavity 11. The mold cavity 11 may have one or more central portions 15, one or more extremity portions 16, and one or more intermediate portions 17. The injection mold may include one or more heater elements 18, for example an electrical rod heater mounted in a machined groove or drilled hole or attached to the mold perimeter.

An apparatus for mold temperature control using air in accordance with the invention may include an air supply port 20 for receiving pressurized air 21 from an air supply system, indicated generally at 22, and an air exhaust port 23 for discharging exhaust air 24 to an air exhaust system, indicated generally at 25. In each of the embodiments shown in FIG. 1, it should be understood that each air supply port 20 is connected to an air supply system 22 (which can be independent or shared by multiple air supply ports), although only one such connection is shown in FIG. 1.

Similarly, it should be understood that each air exhaust port 23 in FIG. 1 is connected to an air exhaust system 25 (which can be independent or shared by multiple air exhaust ports), although only one such connection is shown in FIG. 1.

An exemplary air supply system 22 may include an air intake 30, an air compressor 31, an after cooler 32, a water cooled after cooler 33, and an air supply valve 34, although this is not required and other structures for providing pressurized air 21 can be used. An exemplary air supply system 22 may cool the pressurized air 21, for example the output of the air compressor 31 can be coupled to the input of the after cooler 32, and the output of the after cooler 32 can be coupled to the input of a water cooled after cooler 33. The output of the water cooled after cooler 33 can be coupled to the input of an air supply valve 34, and the output of the air supply valve 34 can be coupled to one or more air supply ports 20. In an open loop system, the air intake 30 may receive air directly from the atmosphere, while in a closed loop system the air intake 30 may receive air from an air exhaust system 25.

An exemplary air exhaust system 25 may include a mixing muffler 35, for example to combine the exhaust air 24 with cooler air or to reduce noise levels, although this is not required and other structures for exhausting air can be used. In an open loop system, the air exhaust system 25 may release the exhaust air 24 directly to the atmosphere. In a closed loop system, the air exhaust system 25 may return the exhaust air 24 to an air intake 30 of an air supply system 22 for recycling. One or more insulation plates 26 can be used to reduce heat transfer from the injection mold 10 to the air supply system 22 and the air exhaust system 25.

Figure 6:
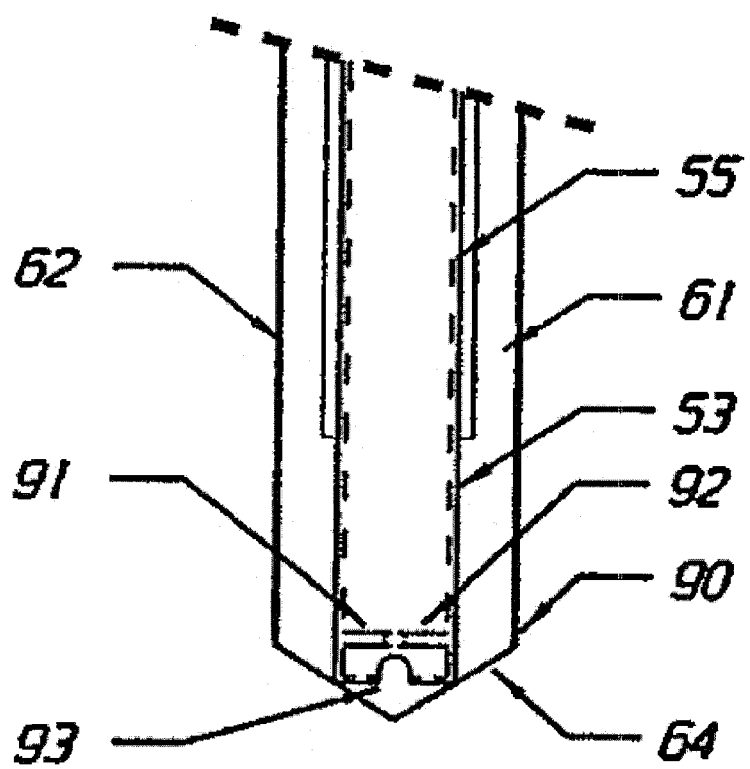
FIG. 6 is a cross-sectional view of an exemplary orifice member for use in a method and apparatus according to the invention.

As shown in FIG. 1, an apparatus for mold temperature control using air in accordance with the invention may include one or more temperature sensors 40, each having a temperature signal connector 41. Each temperature sensor 41 can include a temperature sensing element 42 (such as a thermocouple, thermistor, resistive temperature detector, or infrared detector) that is preferably at least partially disposed within a protective housing 43, for example a flexible metal sheath. One or more temperature sensors 40 can be positioned in proximity to a molding surface to form one or more molding surface temperature sensors 44 for measuring the temperature of the molding surface. One or more temperature sensors 40 can be positioned at other suitable locations on, in, or near the mold, to form one or more periphery temperature sensors 45 for measuring the temperature of various portions of the mold. Although this is not shown in FIG. 1, it should be understood that the temperature signal connector 41 of each temperature sensor 40 can be connected to a process controller 46 as shown in FIG. 6, whereby the process controller 46 may receive temperature signals or data from the one or more temperature sensors 40 for use in controlling the temperature of one or more portions of the mold.

Figure 2:
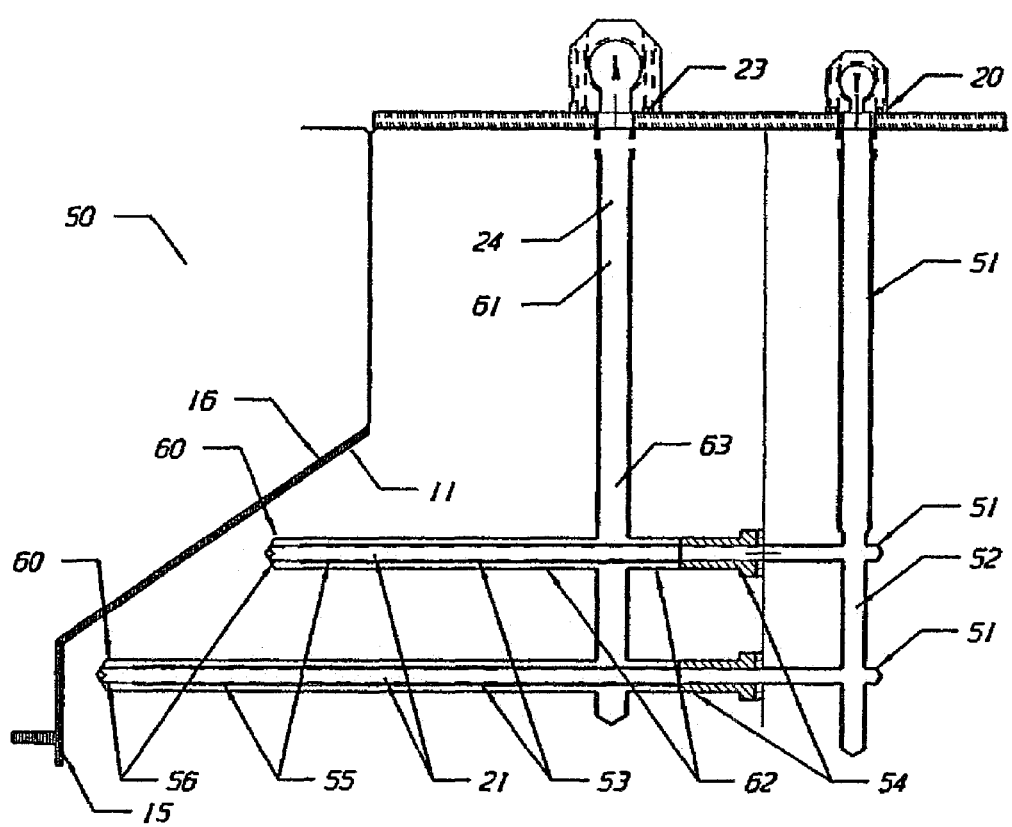
FIG. 2 is a cross-sectional view of an exemplary apparatus for mold temperature control according to the invention.

In a first embodiment of an apparatus for mold temperature control using air in accordance with the invention as shown generally in FIG. 1 and in greater detail in FIG. 2, a first air jet cooling assembly, indicated generally at 50, provides cooling adjacent to a central portion 15 and an extremity portion 16 of the mold cavity 11. An air supply port 20 can be coupled, for example, to one or more air supply bores 51 to form an air supply manifold 52. The air supply manifold 52 can be coupled to one or more air supply tubes 53, preferably using one or more air supply tube fittings 54. Each air supply tube 53 is preferably at least partially surrounded by an insulating jacket 55. Each air supply tube 53 supplies air to at least one orifice member 60 that can be formed, for example, by sealing the distal end 56 of the air supply tube 53 except for a small aperture.

The orifice member 60 is adapted to be in thermal communication with a portion of the mold where cooling is desired, for example by positioning the orifice member 60 adjacent to or in contact with that portion of the mold or by positioning the orifice member 60 so exhaust air 24 from the orifice member 60 flows onto that portion of the mold. Additional structures, for example, one or more heat sinks, cooling fins, or heat conduction elements, can also be used to enhance the thermal communication between the orifice member 60 and the portion of the mold where cooling is desired.

The orifice member 60 is adapted to receive pressurized air 21 from an air supply tube 53, and to release a portion of the pressurized air 21 into an exhaust channel 61 as exhaust air 24. This can be accomplished, for example, by positioning the orifice member 60 at the distal end 56 of an air supply tube 53 located in an exhaust channel 61. It is believed that the cooling which occurs at the orifice member may be due to the Joule-Thomson effect, but it is understood that the invention is not limited by a particular theory of the underlying physics. The exhaust channel 61 may include, for example, a plurality of exhaust bores 62 to form an exhaust manifold 63. The exhaust manifold 63 can be connected to an air exhaust port 23 coupled to an air exhaust system 25.

Figure 3:
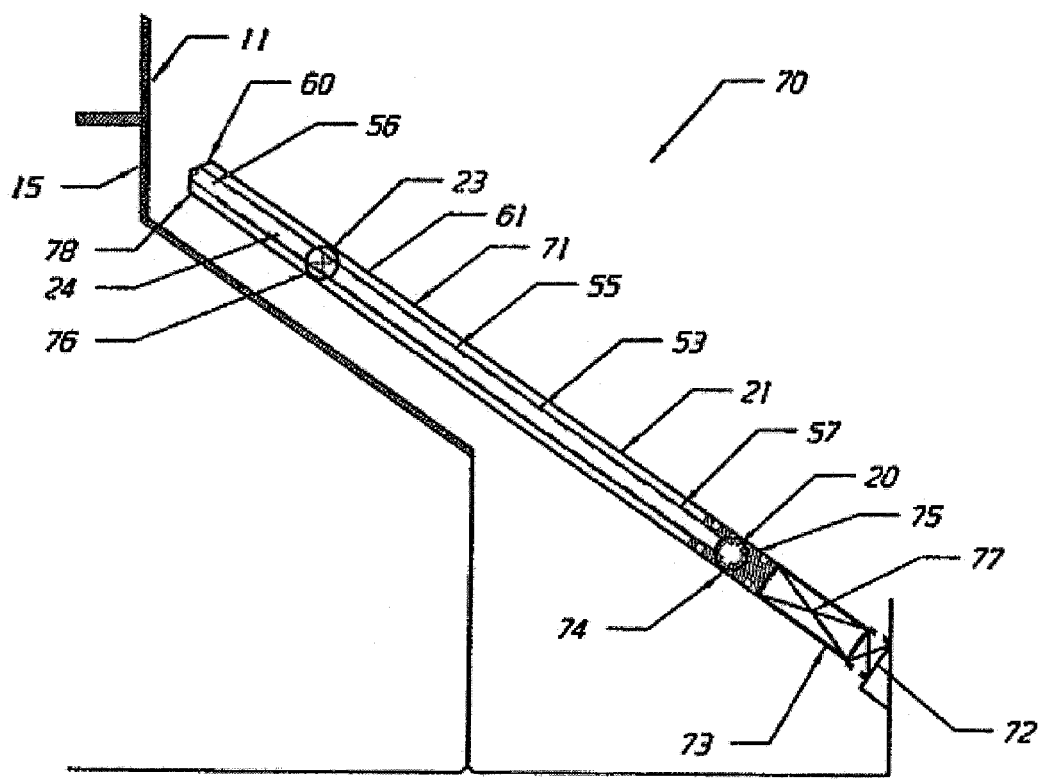
FIG. 3 is a cross-sectional view of another example of an apparatus for mold temperature control according to the invention.

In a second embodiment of an apparatus for mold temperature control using air in accordance with the invention as shown generally in FIG. 1 and in greater detail in FIG. 3, a second air jet cooling assembly, indicated generally at 70, provides cooling adjacent to a central portion 15 of the mold cavity 11. An air supply tube 53 having a distal end 56 and a proximal end 57 is centrally mounted in a combination bore 71. An end plug 72 can be used to seal the proximal end 73 of the combination bore 71.

An air supply port 20 supplies pressurized air 21 to the air supply tube 53, for example via a side air supply bore 74 coupled to a side feed air supply fitting 75 mounted to the proximal end 57 of the air supply tube 53. The air supply tube 53 supplies pressurized air 21 to at least one orifice member 60. The air supply tube 53 is preferably at least partially surrounded by an insulating jacket 55.

The orifice member 60 is adapted to receive the pressurized air 21 from the air supply tube 53, and to release a portion of the pressurized air 21 into an exhaust channel 61 as exhaust air 24. The exhaust channel 61 releases the exhaust air 24 to an air exhaust system 25, for example by releasing the exhaust air 24 into a portion of the combination bore 71 that is coupled to a side air exhaust bore 76 leading to an air exhaust port 23, where the air exhaust port 23 is coupled to an air exhaust system 25.

The orifice member 60 is adapted to be in thermal communication with a portion of the mold where cooling is desired, for example by positioning the orifice member 60 adjacent to or in contact with that portion of the mold. A compression spring 77 can be positioned between the end plug 72 and the side feed air supply fitting 75 to apply compression force against the side feed air supply fitting 75 to press the distal end 56 of the air supply tube 53 into contact with the distal end 78 of the combination bore 71.

Figure 4:
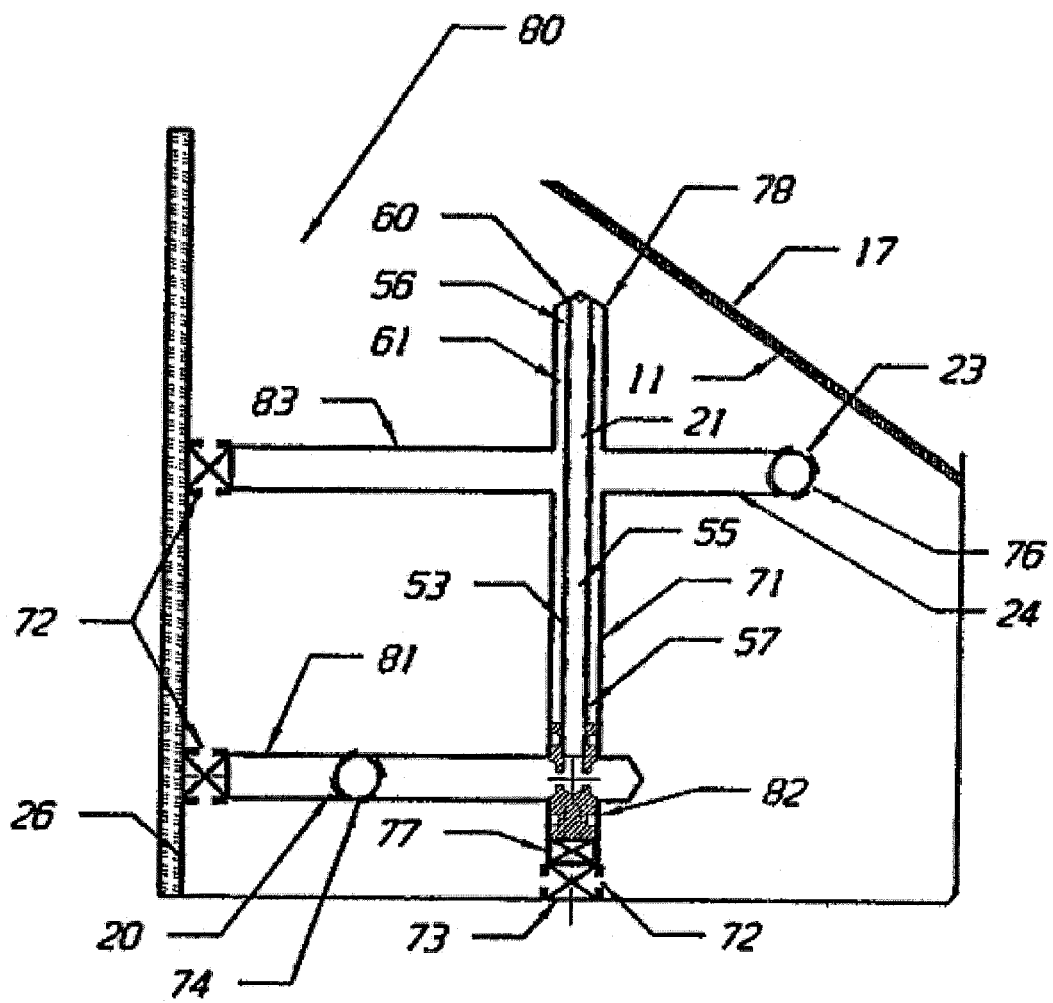
FIG. 4 is a cross-sectional view of an alternative example of an apparatus for mold temperature control according to the invention.

In a third embodiment of an apparatus for mold temperature control using air in accordance with the invention as shown generally in FIG. 1 and in greater detail in FIG. 4, a third air jet cooling assembly, indicated generally at 80, provides cooling adjacent to an intermediate portion 17 of the mold cavity 11. An air supply tube 53 having a distal end 56 and a proximal end 57 is centrally mounted in a combination bore 71. An end plug 72 can be used to seal the proximal end 73 of the combination bore 71.

An air supply port 20 supplies pressurized air 21 through the air supply tube 53, for example via a side air supply bore 74 leading to a horizontal air supply bore 81 coupled to a horizontal feed air supply fitting 82 mounted to the proximal end 57 of the air supply tube 53. The air supply tube 53 supplies pressurized air 21 to at least one orifice member 60. The air supply tube 53 is preferably at least partially surrounded by an insulating jacket 55.

The orifice member 60 is adapted to receive the pressurized air 21 from the air supply tube 53, and to release a portion of the pressurized air 21 into an exhaust channel 61 as exhaust air 24. The exhaust channel 61 releases the exhaust air 24 to an air exhaust system 25, for example by releasing the exhaust air 24 into a portion of the combination bore 71 coupled to a horizontal air exhaust bore 83 leading to a side air exhaust bore 76 that leads in turn to an air exhaust port 23.

The orifice member 60 is adapted to be in thermal communication with a portion of the mold where cooling is desired, for example by positioning the orifice member 60 adjacent to or in contact with that portion of the mold. A compression spring 77 can be positioned between the end plug 72 and the horizontal feed air supply fitting 82 to apply compression force against the horizontal feed air supply fitting 82 to press the distal end 56 of the air supply tube 53 into contact with the distal end 78 of the combination bore 71.

Figure 5:
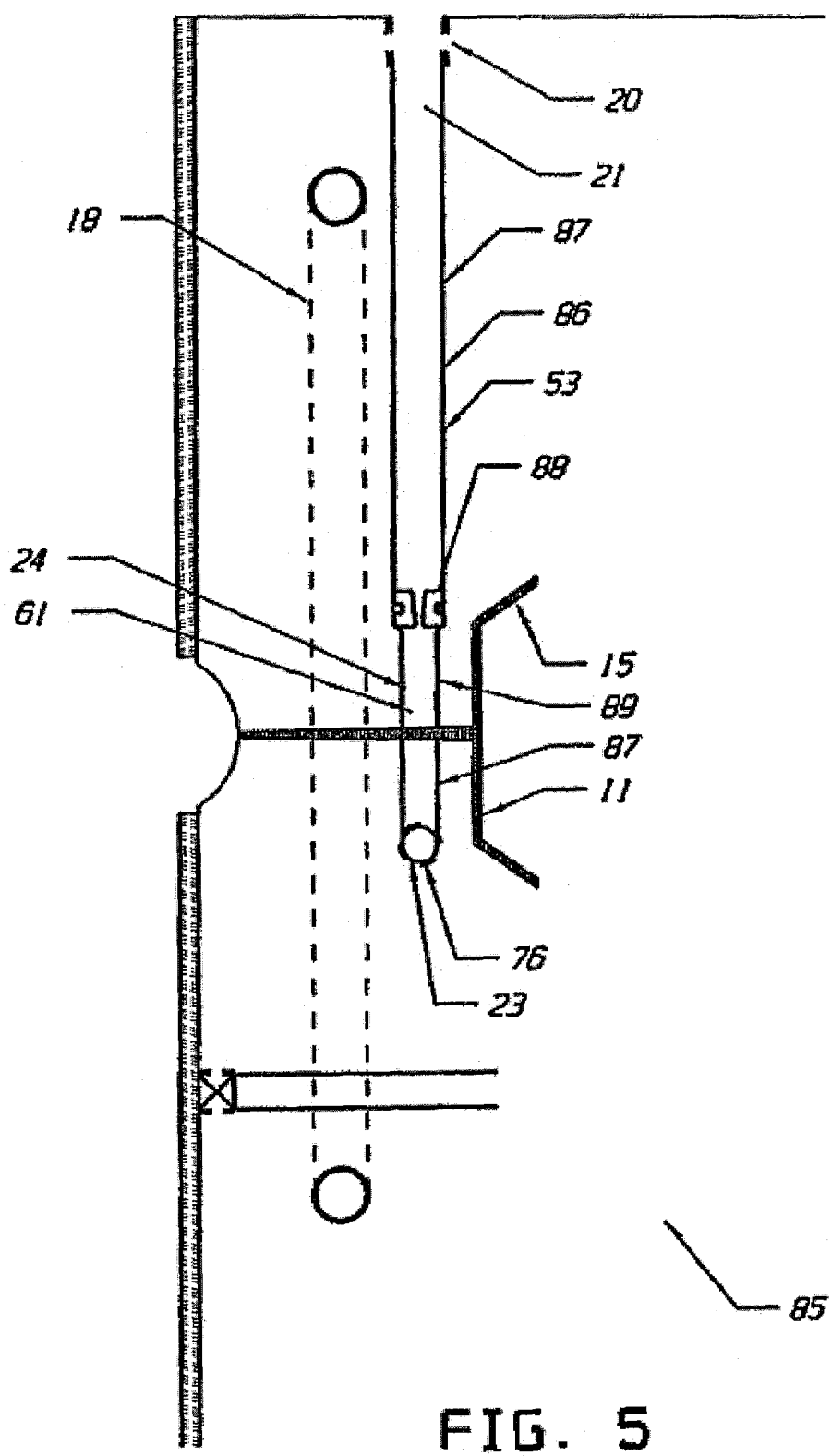
FIG. 5 is a cross-sectional view of a another exemplary apparatus for mold temperature control according to the invention.

In a fourth embodiment of an apparatus for mold temperature control using air in accordance with the invention as shown generally in FIG. 1 and in greater detail in FIG. 5, a third air jet cooling assembly, indicated generally at 85, provides cooling to a portion of the injection mold 10, for example, a portion located between a heater element 18 and a central portion 15 of the mold cavity 11.

An air supply port 20 supplies pressurized air 21 to an air supply tube 53. The air supply tube 53 can be formed, for example, as a first portion 86 of an inline bore 87. The air supply tube 53 supplies pressurized air 21 to at least one inline orifice member 88 that can be formed, for example, as a disk or plug having a small aperture and mounted at an intermediate position in the inline bore 87.

The inline orifice member 88 is adapted to receive the pressurized air 21 from the air supply tube 53, and to release a portion of the pressurized air 21 into an exhaust channel 61 as exhaust air 24. The exhaust channel 61 can be formed, for example, as a second portion 89 of an inline bore 87 leading to a side air exhaust bore 76 that leads in turn to an air exhaust port 23. The inline orifice member 88 is adapted to be in thermal communication with a portion of the mold where cooling is desired, for example by positioning the inline orifice member 88 adjacent to or in contact with that portion of the mold.

FIG. 6 shows a first exemplary orifice member 90 for use in a method and apparatus according to the invention. The orifice member 90 includes a disk 92 having a central aperture 91 and mounted within an air supply tube 53. One or more notches 93 can be formed in the air supply tube to allow exhaust air to escape from the periphery of the exhaust tube. The air supply tube 53 can be centrally mounted within an air exhaust channel 61, for example within an air exhaust bore 62 and preferably in contact with the distal end 64 of the air exhaust bore 62. An insulating jacket 55 preferably surrounds at least a portion of the air supply tube 53.

Figure 7:
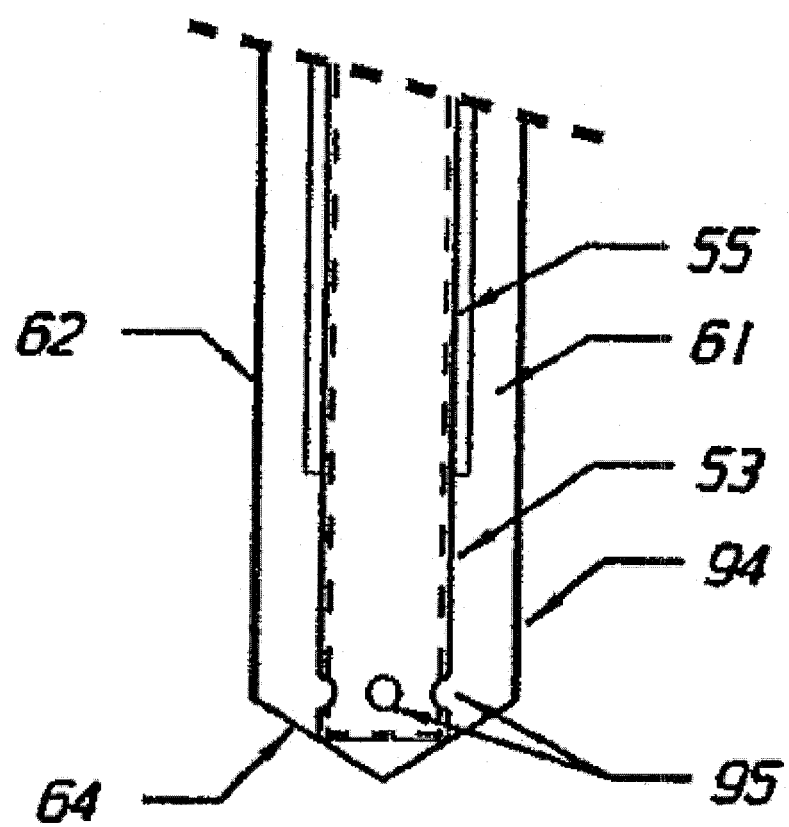
FIG. 7 is a cross-sectional view of another example of an orifice member for use in a method and apparatus according to the invention.

FIG. 7 shows a second exemplary orifice member 94 for use in a method and apparatus according to the invention. The second exemplary orifice member 94 may include one or more peripheral apertures 95 that can be formed, for example, as holes in an air supply tube 53. The air supply tube 53 can be mounted within an air exhaust channel 61, for example within an air exhaust bore 62 and preferably in contact with the distal end 64 of the air exhaust bore 62. An insulating jacket 55 preferably surrounds at least a portion of the air supply tube 53.

Figure 8:
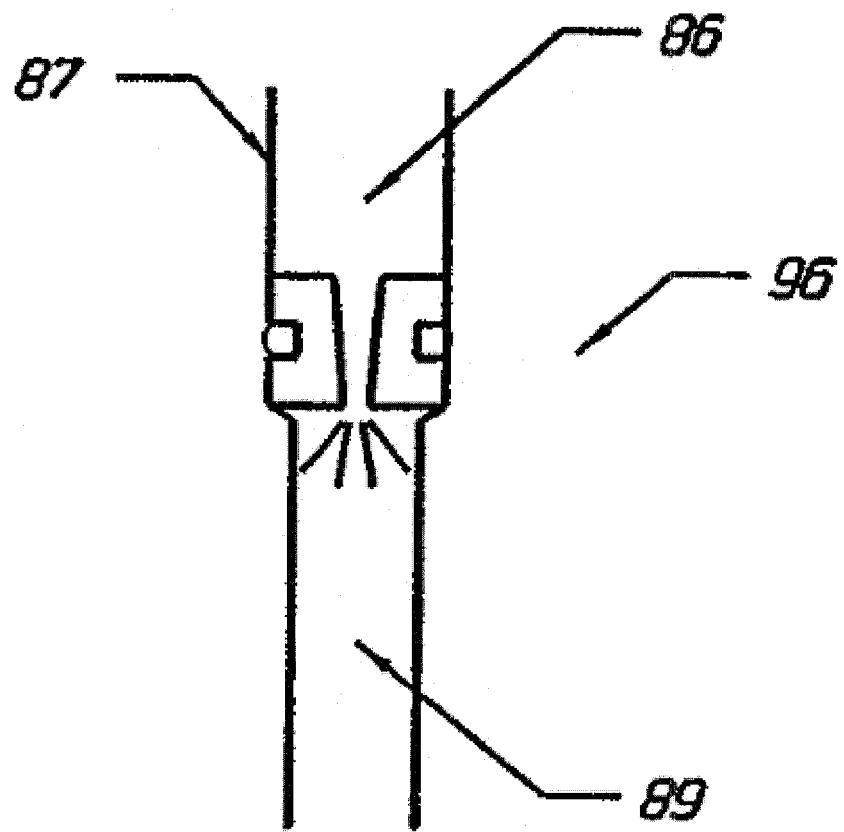
FIG. 8 is a cross-sectional view of an alternative example of an orifice member for use in a method and apparatus according to the invention.

FIG. 8 shows a third exemplary orifice member 96 for use in a method and apparatus according to the invention. The third exemplary orifice member 96 can be formed as a restriction, for example a disk having a small hole, a porous plug, or a capillary tube, between a first portion 86 and a second portion 89 of an inline bore 87.

Figure 9:
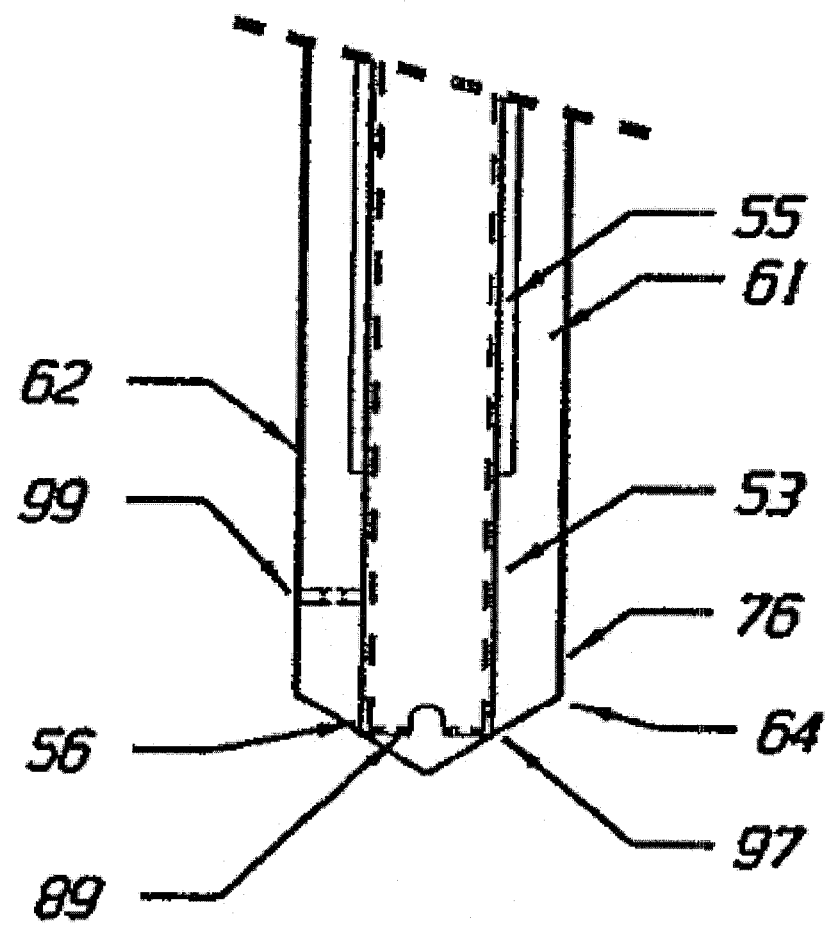
FIG. 9 is a cross-sectional view of another exemplary orifice member for use in a method and apparatus according to the invention.

FIG. 9 shows a fourth exemplary orifice member 97 for use in a method and apparatus according to the invention. The orifice member 97 includes one or more peripheral notches 98 formed on the periphery of the distal end 56 of an air supply tube 53. The air supply tube 53 can be centrally mounted within an air exhaust channel 61, for example an air exhaust bore 62. By positioning the distal end 56 of the air supply tube 53 in contact with a solid structure, for example the distal end 64 of an air exhaust bore 62, the distal end 56 of the air supply tube 53 is sealed, except for the peripheral notches 98 that thereby form apertures from the orifice member 97. An insulating jacket 55 preferably surrounds at least a portion of the air supply tube 53. A standoff 99 can be used to keep the air supply tube 53 centered within the air exhaust channel 61.

Figure 10:
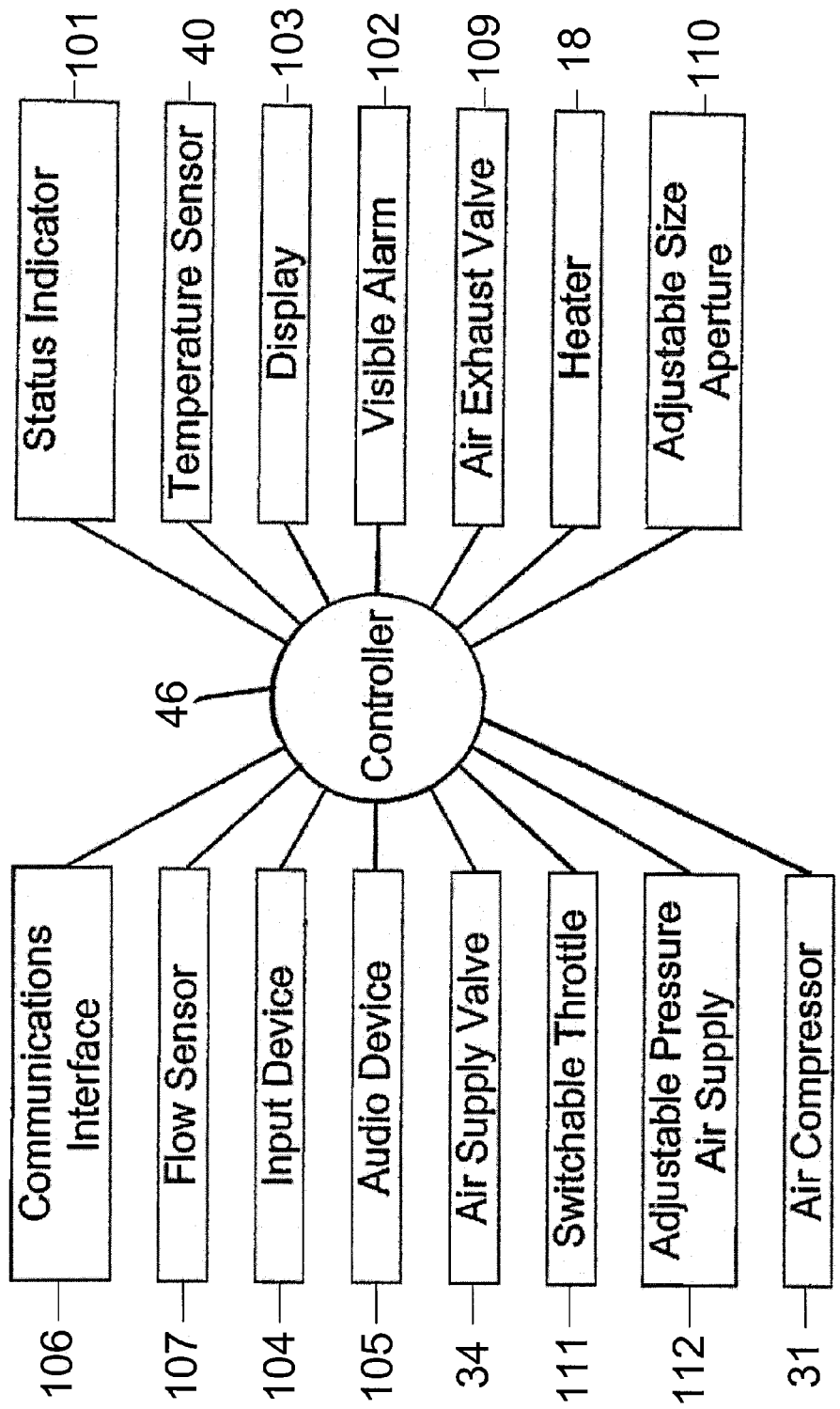
FIG. 10 is a block diagram of a cooling apparatus according to the invention.

FIG. 10 shows a block diagram of the various components of a cooling apparatus according to the invention. The apparatus may include a process controller 46, for example a conventional programmable controller or general purpose computer. The apparatus may include one or more user interface devices, for example one or more status indicators 101 or visible alarms 102, for example a light emitting diode (LED), liquid crystal display (LCD), incandescent light, colored panel, or the like. The apparatus may include a general purpose information display 103, for example a flat panel display or cathode ray tube (CRT) display. The apparatus may include one or more input devices 104, for example a keyboard, switch, touch screen, mouse, key lock, pen input, or the like. The apparatus may include one or more audio devices 105, for example an audible alarm, speaker, or the like for providing audible status, information, help, or alarm messages. The apparatus may include a communications interface 106, for example an twisted pair ethernet interface, 802.11 wireless network interface, RS-232 serial interface, or the like, to provide status and control communication with external control or monitoring systems.

The controller 46 can be adapted to receive status information for use in controlling the timing and magnitude of heating or cooling that is applied to portions of the injection mold. For example, the controller 46 may receive air flow information from one or more air flow sensors 107 positioned to measure air flow, for example in an air supply tube 53, in an orifice member 60 or inline orifice member 95, or in an air exhaust channel 61. The controller may receive temperature information from one or more temperature sensors 40.

The controller 46 can be adapted to control the timing and magnitude of heating that is applied to portions of the injection mold by activating a heater 18.

The controller 46 can be adapted to adjust or control various components of the apparatus for controlling the timing and magnitude of cooling that is applied to portions of the injection mold. For example, the controller 46 may open, partially open, close, or partially close one or more air supply valves 108 or air exhaust valves 109. The controller 100 may open, partially open, close, or partially close an adjustable size aperture 110 in an orifice member. The controller 46 may open, partially open, close, or partially close a switchable orifice member 111. The controller may adjust or control the pressure of the pressurized air produced by an adjustable pressure air supply 112.

There are various possibilities with regard to alternative embodiments and applications of a method and apparatus using air for controlling the temperature of an injection mold.

Although the exemplary embodiments of the present invention refer to air as the gas for operation, other gases known to those skilled in the art as having suitable properties can be appropriately substituted. For example, nitrogen or carbon dioxide gases could be used in an appropriate case.

Although the exemplary embodiments of the present invention show air supply tubes and air exhaust channels comprised of one or more elongated cylinders, other shapes can be used. It is not important to the invention that either the air supply tubes or the air exhaust channels are either elongated or cylindrical.

It is understood that the invention is not limited to the particular embodiments described herein, but embraces all such modified forms thereof as come within the scope of the following claims.

What is claimed is:

1. An apparatus comprising:
   (a) an injection mold having one or more portions;
   (b) a gas supply tube containing a gas at a first pressure;
   (c) an orifice member having an orifice thereon in thermal communication with at least one portion of the injection mold, wherein the orifice member is operably coupled to receive the gas from the gas supply tube, and wherein the orifice member is adapted to release the gas from the gas supply tube through the orifice;
   (d) a gas exhaust channel containing the gas at a second pressure, wherein the gas exhaust channel is operably coupled to receive the gas from the orifice member, and wherein the second pressure is lower than the first pressure; and
   (e) a gas supply system operably coupled to supply the gas at the first pressure to the gas supply tube, and wherein the gas supply system includes at least one gas cooler adapted to cool the supply of gas at the first pressure; whereby at least one portion of the mold is cooled.

2. The apparatus of claim 1 wherein the gas includes air.

3. The apparatus of claim 1 wherein at least a portion of the gas supply tube is cylindrical.

4. The apparatus of claim 1 wherein at least a portion of the gas exhaust channel is cylindrical.

5. The apparatus of claim 1 wherein at least a portion of the gas supply tube is surrounded by the exhaust channel.

6. The apparatus of claim 1 wherein at least a portion of the gas supply tube is surrounded by an insulating jacket.

7. The apparatus of claim 1 wherein the gas exhaust channel includes a bore portion having a closed distal end located within the injection mold, wherein the gas supply tube includes a pipe portion with an end having at least one orifice member, and wherein at least a portion of the end of the pipe portion of the gas supply tube is positioned in thermal contact with the closed distal end of the bore portion of the gas exhaust channel.

8. The apparatus of claim 1 wherein the gas exhaust channel includes a bore portion having a closed distal end located within the injection mold, wherein the gas supply tube includes a pipe portion with an end having at least one orifice member, and wherein at least a portion of the end of the pipe portion of the gas supply tube is positioned adjacent to the closed distal end of the bore portion of the exhaust channel.

9. The apparatus of claim 1 wherein the gas exhaust channel includes a bore portion, wherein the gas supply tube includes a bore portion, and wherein the orifice member has a first side operably coupled to the bore portion of the gas supply tube and a second side operably coupled to the bore portion of the gas exhaust channel.

10. The apparatus of claim 1 further comprising a gas supply system operably coupled to supply the gas at the first pressure to the gas supply tube, and wherein the gas supply system includes at least one gas compressor.

11. The apparatus of claim 1 further comprising a gas supply system operably coupled to supply the gas at the first pressure to the gas supply tube, and wherein the gas supply system can be operated to adjust the flow rate of the gas at the first pressure between a non-zero flow rate and a flow rate which is essentially zero.

12. The apparatus of claim 1 further comprising a gas supply system operably coupled to supply the gas at the first pressure to the gas supply tube, and wherein the gas supply system can be operated to adjust the flow rate of the gas at the first pressure to two or more non-zero flow rates.

13. The apparatus of claim 1 further comprising a gas supply system operably coupled to supply the gas at the first pressure to the gas supply tube, and wherein the gas supply system can be operated to adjust the magnitude of the pressure of the gas at the first pressure.

14. The apparatus of claim 1 further comprising a gas supply system operably coupled to supply the gas at the first pressure to the gas supply tube wherein the gas supply system can be operated to adjust the magnitude of the pressure of the gas at the first pressure, and a controller operably coupled to operate the gas supply system.

15. The apparatus of claim 1 further comprising a gas supply system operably coupled to supply the gas at the first pressure to the gas supply tube wherein the gas supply system can be operated to adjust the flow rate of the gas at the first pressure, and a controller operably coupled to operate the gas supply system.

16. The apparatus of claim 1 further comprising a gas supply system operably coupled to supply the gas at the first pressure to the gas supply tube wherein the gas supply system can be operated to adjust the flow rate of the gas at the first pressure, a temperature sensor adapted to measure the temperature of at least one portion of the injection mold and to produce at least one temperature signal, and a controller operably coupled to receive the at least one temperature signal from the temperature sensor and operably coupled to operate the gas supply system.

17. The apparatus of claim 1 further comprising a gas supply system operably coupled to supply the gas at the first pressure to the gas supply tube wherein the gas supply system can be operated to adjust the magnitude of the pressure of the gas at the first pressure, a temperature sensor adapted to measure the temperature of at least one portion of the injection mold and to produce at least one temperature signal, and a controller operably coupled to receive the at least one temperature signal from the temperature sensor and operably coupled to operate the gas supply system.

18. The apparatus of claim 1 further comprising a gas exhaust system operably coupled to receive the gas at the second pressure from the gas exhaust channel, and wherein the gas exhaust system can be operated to adjust the magnitude of the pressure of the gas at the second pressure.

19. The apparatus of claim 1 further comprising a gas exhaust system operably coupled to receive the gas at the second pressure from the gas exhaust channel wherein the gas exhaust system can be operated to adjust the magnitude of the pressure of the gas at the second pressure, and a controller operably coupled to operate the gas exhaust system.

20. The apparatus of claim 1 further comprising a gas exhaust system operably coupled to receive the gas at the second pressure from the gas exhaust channel wherein the gas exhaust system can be operated to adjust the magnitude of the pressure of the gas at the second pressure, a temperature sensor adapted to measure the temperature of at least one portion of the injection mold and to produce at least one temperature signal, and a controller operably coupled to receive the at least one temperature signal from the temperature sensor and operably coupled to operate the gas exhaust system.

21. The apparatus of claim 1 further comprising a gas exhaust valve operably coupled to receive the gas at the second pressure from the gas exhaust channel.

22. The apparatus of claim 1 further comprising a gas supply system operably coupled to supply the gas at the first pressure to the gas supply tube and a gas exhaust system operatively coupled to receive the gas at the second pressure from the gas exhaust channel, wherein the gas supply system is operably coupled to receive the gas at the second pressure from the gas exhaust system.

23. The apparatus of claim 1 wherein at least a portion of the orifice member is in thermal contact with the at least one portion of the injection mold, thereby providing thermal communication between the orifice member and the at least one portion of the injection mold.

24. The apparatus of claim 1 wherein at least a portion of the gas released from the orifice member strikes the at least one portion of the injection mold, thereby cooling the at least one portion of the injection mold.

25. The apparatus of claim 1 further comprising a thermally conductive member, wherein at least a portion of the thermally conductive member is in thermal contact with at least a portion of the orifice member, and wherein at least a portion of the thermally conductive member is in thermal contact with the at least one portion of the injection mold, thereby cooling the at least one portion of the injection mold.

26. The apparatus of claim 1 further comprising a thermally conductive member, wherein at least a portion of the gas released from the orifice member strikes at least a portion of the thermally conductive member, and wherein at least a portion of the thermally conductive member is in thermal contact with the at least one portion of the injection mold, thereby cooling the at least one portion of the injection mold.

27. The apparatus of claim 1 further comprising a gas supply valve, wherein the gas supply tube is operably coupled to receive the gas at the first pressure from the gas supply valve.

28. The apparatus of claim 27 wherein the gas supply valve can be operated to adjust the flow rate of the gas at the first pressure between a non-zero flow rate and a flow rate which is essentially zero.

29. An apparatus comprising:
(a) an injection mold having one or more portions;
(b) a pipe containing a gas at a first pressure and having at least one orifice member in thermal communication with at least one portion of the injection mold;
(c) a bore in the injection mold at least partially surrounding the orifice member and containing the gas at a second pressure, wherein the second pressure is no higher than the first pressure, and further wherein the bore provides an exhaust channel for the gas; and
(d) a gas supply system operably coupled to supply the gas at the first pressure to the pipe, and wherein the gas supply system includes at least one gas cooler adapted to cool the supply of gas at the first pressure;
whereby the release of gas from the pipe through the orifice member into the bore cools the at least one portion of the injection mold.

30. The apparatus of claim 29 wherein the bore has a distal end at least partially surrounded by the injection mold, wherein the pipe has an end at least partially surrounded by the distal end of the bore, and wherein the orifice member is located at the end of the pipe.

31. The apparatus of claim 29 wherein the gas includes air.

* * * * *